United States Patent Office 3,463,747
Patented Aug. 26, 1969

3,463,747
DICYANDIAMIDE MODIFIED RESIN BINDERS
Lawrence E. Noll, Waterloo, Belgium, and James F. Farish, Hanahan, S.C., assignors to Westvaco Corporation, New York, N.Y., a corporation of Delaware
No Drawing. Continuation-in-part of application Ser. No. 454,677, May 10, 1965. This application Nov. 8, 1967, Ser. No. 681,592
Int. Cl. C08g 37/32, 51/10
U.S. Cl. 260—17.5                                              4 Claims

ABSTRACT OF THE DISCLOSURE

Aqueous binders of low solids content used primarily in the manufacture of mineral fiber mats having increased heat stability, dry tensile strength, wet tensile strength and efficiency as well as highly desirable curing characteristics, by virtue of the combination of a thermosetting resin consisting of dicyandiamide-formaldehyde and phenol-formaldehyde, alkali lignin, and urea.

---

This application is a continuation-in-part of copending U.S. application Ser. No. 454,677, filed May 10, 1965.

This invention relates to an improved binder primarily used in the manufacture of mineral fiber mats and is particularly concerned with a binder composition of low solids content containing a water-dilutable thermosetting resin, alkali lignin and urea.

In the common commercial method of manufacturing mineral fiber mats, mineral is first attenuated while in a molten state to a fibrous form. This is accomplished in a collecting or forming chamber where a spray of aqueous thermosetting resin is introduced. This spray cools the molten mineral in the fibrous shape and, at the same time, deposits a thin resin coating on the thus formed fibers. The resin coated fibers are then felted on a traveling grate or conveyor which removes them from the chamber and carries them to an oven where the resin is cured, thereby bonding the individual fibers together into a mat.

While the method for making mineral fiber mats is basically the same in all processes, widely variant conditions and apparatus may be employed in actual operation. Thus the basic raw material to make the fibers may be selected from such materials as silica, magnesia, alumina, soda and lime in various combinations with one another and with small amounts of other ingredients. Attenuation of the molten mineral may be accomplished by passing it through a rapidly revolving orifice where fibrilation is caused by centrifugal forces or by extruding the molten mineral through a spinneret in the form of a tiny stream into the path of a blast of hot gases. Regardless of the specific conditions employed, the basic process is essentially the same and well known as shown in such U.S. patents as No. 2,550,465, No. 2,604,427 and No. 2,830,648.

Until recently, the only resins which have proved to be satisfactory binders for use in this process were the alkaline-catalyzed phenol-formaldehyde resins. In recent years, however, a much less expensive binder, described in U.S. Patent No. 3,285,801, composed of phenol-formaldehyde resin alkali lignin, and urea has been introduced and has found wide acceptance in the field, particularly in the manufacture of rock wool products. While having many desirable features, and in many regards actually outperforming the straight conventional phenolic resins, the lignin-urea-phenolic resin compositions do have several disadvantageous features. Principal among these is its somewhat lower "efficiency," which as the term is employed in the mineral fiber field is the percentage of binder solids sprayed into the blow or forming chamber which are retained in the final cured mat. Although the efficiency of lignin-urea-phenolic resin compositions may vary considerably depending upon the particular conditions employed, the efficiency of such binders generally varies from about 68 to 75%. This is somewhat below the usual efficiencies of from 75 to 80% usually obtained with the conventional phenolic resins. The net result of this lower efficiency is that in order to obtain the same binder content in the final cured mat a larger quantity of binder solids must be sprayed onto the fibers.

Another disadvantage of lignin-urea-phenolic resin compositions is their relatively low heat stability. Heat stability is used to denote the degradation of bonding strength of a product. The primary use of mineral fiber mats is in thermal insulation. Use of these mats in high temperature application has been limited due to degradation of the binder at temperatures above 450° F. with consequent break down of the structure of the mat and greatly reduced insulation properties. The lignin-urea-phenolic resin compositions while having slightly better resistance to high temperature degradation than the conventional phenolic resins, are still far from being satisfactory. The binder of this invention is not limited to use in the manufacture of mineral fiber mats as the excellent properties produced lend applicability to other areas, i.e., plywood manufacture.

It is the principal object of this invention to improve the efficiency, heat stability and tensile strengths of lignin-urea-phenolic resin binder compositions.

Other objects will be evident from the following disclosure.

It has been found that the heat stability, efficiency, and tensile strengths of lignin-urea-phenolic resins can be greatly enhanced by the addition of minor quantities of dicyandiamide-formaldehyde resin. To obtain these unexpected benefits, however, the quantities of each of the four components must be maintained within certain specific limitations.

Of the four components, the phenol-formaldehyde and dicyandiamide-formaldehyde are, independently, water-dilutable thermosetting resins. In the binder the total of these thermosetting resins must be between 20 and 70% of the total binder solids. Of this total resin the phenol-formaldehyde resin may vary between 50 and 90% with the dicyandiamide-formaldehyde resin constituting the remaining 10 to 50%. The quantity of urea present in the binder may vary from about 10 to 50% of the total binder solids. The quantity of urea is, however, additionally limited to no more than five times the weight of dicyandiamide-formaldehyde present. The quantity of lignin is limited to a minimum of 16% and a maximum of 60% of the total binder solids.

The inter-relationship of the various components may be better understood by referring to the following examples.

EXAMPLE I 408 parts by weight of dicyandiamide were charged into a reaction kettle together with 241 parts by weight of 91% solids paraformaldehyde and 351 parts by weight of water. The reaction mixture was heated to 75° C. (167° F.) during a period of 15 minutes and the temperature maintained at that level for one hour. When cooled the resin solution referred to hereafter as Resin A had the following properties:

pH _____ 8.0.
Solids, percent _____ 50.9.
Visc. cps. at 25° C. _____ 22.
Water dilutability at approx.
  25° C. _____ Infinite.
Stability _____ No precipitation after 14 days at room temperature.

342 parts by weight of 92% phenol, and 500 parts of 44% formaldehyde solution were charged into a reaction vessel and heated at 72° C. (162° F.) for 110 minutes. Incremental additions of sodium hydroxide were made periodically until a total of 11.7 parts by weight had been added at the end of 55 minutes. This resin solution referred to hereafter as Resin B had the following properties:

pH _____ 8.3
Solids, percent _____ 47.8
Visc. cps. at 25° C. _____ 29
Water dilutability at approx. 25° C. ___ Infinite
Stability _____days__ >14

The cure rates and bond strengths of each of these resins was determined. The cure rates, determined by placing 3 ml. of resin solution at 25% solids on a hot plate at 300° F. and measuring the time required for the resin to lose its fluidity (body time) and the time for the resin to form an infusible mass (cure time), provide an excellent indication of the ability of the resin to perform in operation. In the manufacture of mineral fiber mats too short a body time, below 70 seconds, indicates that the resin will "precure" in the collecting chamber losing its flow and preventing adequate bonding of the fibers. Too long a cure time, in excess of about 500 seconds, indicates that the resin will not become properly cured in the process resulting in lack of strength and resiliency in the finished mineral fiber mat. The body time and cure time limitations are most applicable to mineral wool mat process; however, superior tensile strengths (wet and dry tensile strengths) are obtainable in certain areas outside these limitations.

The tensile strength are determined by coating glass beads with a resin solution to retain 3.5% by weight of resin solids based on the weight of the glass beads. The resin coated glass beads are molded in the shape of a flattened dog bone having a thickness of ¼ inch and cured. The tensile strength of these dog bones is then determined after curing and cooling (dry tensile) and after the cured dog bones have beeen exposed to 212° F. and 100% relative humidity for 2 hours (wet tensile). The results obtained for Resins A and B are as follows:

|  | Resin A | Resin B |
|---|---|---|
| Body time, secs | 65 | 85 |
| Cure time, secs | 125 | 110 |
| Dry tensile, p.s.i | 255 | 210 |
| Wet tensile, p.s.i | 0 | 50 |

It should be noted that Resin A, when used alone, is unsuitable for mineral fibers due to its low body time and lack of water resistance when cured.

Various mixtures of Resins A and B (phenol-dicyandiamide-formaldehyde resins) containing 25, 50, and 75% Resin A (on a solids basis) all exhibited body times and wet tensiles intermediate between the values obtained for the resins by themselves.

An aqueous solution of urea and free acid kraft pine lignin was prepared by adding 330 parts by weight of urea and 33 parts of weight of ammonia as a 26° Bé. aqueous solution to 3300 parts by weight of water. After the urea had dissolved, 785 parts by weight of lignin was added and dissolved producing a solution of 25% solids having a pH of 9.5 at 25° C. and containing lignin and urea in a 70:30 ratio.

By combining the lignin-urea solution and Resin A and B in varying proportions, binder solutions having the following compositions, based on percent by weight of the total solids content, were produced:

| Binder No. | Phenol formaldehyde resin | Dicyandiamide formaldehyde resin | Urea | Lignin |
|---|---|---|---|---|
| 1 | 40 | 0 | 19 | 41 |
| 2 | 30 | 10 | 19 | 41 |
| 3 | 20 | 20 | 19 | 41 |
| 4 | 10 | 30 | 19 | 41 |
| 5 | 0 | 40 | 19 | 41 |
| 6 | 30 | 0 | 21 | 49 |
| 7 | 22.5 | 7.5 | 21 | 49 |
| 8 | 15 | 15 | 21 | 49 |
| 9 | 7.5 | 7.5 | 21 | 49 |
| 10 | 0 | 30 | 21 | 49 |

Cure rates and tensile strengths were determined for each of these binder solutions. Additionally, resin "efficieny" was determined by measuring the loss of binder solids after subjecting the binder for two hours to hot gases at 150 C. (302° F.). Such efficiencies should not be confused with those obtained in commercial operation which are approximately 80% of the stated value. The results of the tests were as follows:

| Binder No. | Cure rates, sec. Body time | Cure time | Tensile strength, p.s.i. Dry | Wet | Efficiency, percent |
|---|---|---|---|---|---|
| 1 | 100 | 210 | 565 | 145 | 93.0 |
| 2 | 95 | 230 | 700 | 160 | 97.7 |
| 3 | 80 | 290 | 410 | 255 | 98.4 |
| 4 | 60 | 345 | 355 | 125 | 99.8 |
| 5 | 35 | 375 | 275 | 85 | 101.2 |
| 6 | 80 | 285 | 600 | 310 | 94.0 |
| 7 | 70 | 310 | 510 | 290 | 97.5 |
| 8 | 70 | 260 | 430 | 325 | 98.0 |
| 9 | 45 | 390 | 355 | 190 | 99.2 |
| 10 | 30 | <400 | 290 | 80 | 100.7 |

It will be noted from the above that where the quantity of dicyandiamide-formaldehyde exceeds the quantity of phenol-formaldehyde that the body times are reduced to a wholly unsatisfactory level (binders 4, 5, 9, and 10). In facts, at the particular ratios of components in binders 7 and 8, the body times are quite marginal. This situation can be improved, however, by increasing the urea content and decreasing the lignin.

The inclusion of the dicyandiamide-formaldehyde resin markedly improves the efficiency of the binder as may be seen by the increased efficiencies of the four component binders 2–5 and 7–10 over binders 1 and 6, which contain no dicyandiamide-formaldehyde resin.

Additionally it might be noted how the use in the composition of major quantities of lignin and urea which are per se both non-resinous and noted for their lack of water resistance unexpectedly improves the wet tensille as compared to the pure resins by themselves.

EXAMPLE II

A mixed dicyandiamide and phenol-formaldehyde resin was prepared by reacting dicyandiamide with formaldehyde and thereafter adding phenol, additional formaldehyde, an alkali-catalyst and heating to effect reaction between the phenol and formaldehyde. The resulting mixed resin contained 22% by weight of dicyandiamide-formaldehyde and 78% by weight of phenol-formaldehyde. It had a solids content of 47.0%, a pH of 7.3 at 25° C., a viscosity of 20 cps. at 25° C., and was infinitely dilutable with water although a small amount of very fine white silt-like precipitate did form. Infinitely water-dilutable is taken to mean 24 or more volumes of water may be mixed with 1 volume of reaction mixture at a temperature of 24–26° C. without causing the mixture to exhibit haziness or become milky. The body time of this resin was 110 seconds and cure time was 145 seconds. On glass beads it yielded a dry tensile strength of 540 p.s.i. and a wet tensile strength of 60 p.s.i.

This resin was then mixed with varying ratios of lignin and urea to produce a series of binders for use in the manufacture of mineral fiber mats. The composition of these binders and a synopsis of their test results are as follows:

| Composition, percent by weight, solids basis | | | | | Results |
|---|---|---|---|---|---|
| PF | DF | TR | Urea | Lignin | |
| 15.6 | 4.4 | 20 | 32 | 48 | Too high a urea/dicyandiamide ratio cure time over 1,000 secs. |
| 19.5 | 5.5 | 25 | 15 | 60 | Good tensile strenghts, but body time 35 secs. |
| 19.5 | 5.5 | 25 | 19 | 56 | Good tensile strengths, but body time 60 secs. |
| 19.5 | 5.5 | 25 | 26 | 49 | Satisfactory.[1] |
| 21.5 | 6 | 27.5 | 18.6 | 54 | Good tensile strengths, but body time 60 secs. |
| 21.5 | 6 | 27.5 | 23.5 | 49 | Satisfactory. |
| 23.4 | 6.6 | 30 | 21 | 49 | Satisfactory, excellent wet strength of 435 p.s.i. |
| 23.4 | 6.6 | 30 | 28 | 42 | Satisfactory. |
| 27.3 | 7.7 | 35 | 20 | 45 | Do. |
| 27.3 | 7.7 | 35 | 23 | 42 | Do. |
| 27.3 | 7.7 | 35 | 28 | 37 | Do. |
| 31.2 | 8.8 | 40 | 14 | 46 | Do. |
| 31.2 | 8.8 | 40 | 24 | 36 | Very good. |
| 31.2 | 8.8 | 40 | 30 | 30 | Satisfactory. |

[1] Satisfactory means a body time above 70 sec., a cure time under 500 sec., an efficiency above binders without dicyandiamide-formaldehyde resin and tensile strengths above binders without ligin-urea or dicyandiamide resin.

PF—Phenol-formaldehyde; DF—Dicyandiamide-formaldehyde; TR—Total resin.

EXAMPLE III

The dry tensile strength test described in Example I measures room-temperature strength but does not measure heat stability. To show the greatly increased heat stability three resin binders, prepared according to prior art knowledge, were compared to resin binders to the instant invention.

The heat-stability test used to evaluate these binders comprised: making dog-bone biscuits from glass beads and a test resin at 3.6% solids level, curing the biscuits for seven minutes at 450° F., cooling them and reheating the cured dog-bone biscuits in air in a muffle furnace at an elevated temperature for two hours, cooling them again, and testing the biscuit in tension.

The results are given in the accompanying table where "PF" indicates phenol-formaldehyde resin and "DF" indicates dicyandiamide-formaldehyde resin:

monomeric phenolic alcohols. Methods of accomplishing this are well known to those skilled in resin making.

While obtaining the necessary water solubility and dilutability characteristics, it is necessary that a relatively high methylol substitution be achieved in order to provide sufficient reactive groups for proper curing with the lignin and urea. It has been determined that between about 1.3 and 2.0 methylol groups should be present per phenolic molecule to achieve this result. In order to obtain this degree of substitution without causing polymerization, an excess of formaldehyde must be employed in cooking. A generally desirable range of phenol/formaldehyde ratios has been found to be between about 1/1.7 to 1/2.5 with a ratio of about 1/2.2 being preferred.

The catalyst for preparing the resin may be selected from any alkaline water soluble alkali metal or alkali earth compound. Such materials as sodium hydroxide, sodium carbonate, sodium sulfite, calcium hydroxide, and barium hydroxide may all be satisfactorily employed. Ammonia and other nitrogen containing bases should not be employed as catalysts as resins prepared with them have greatly reduced solubility and stability characteristics, particularly in the presence of lignin. The quantity of catalyst employed should in general be limited to 0.1 mole per mole of phenol to avoid excessive polymeric formation.

Free formaldehyde present in the phenol formaldehyde resin solution at the end of the cook, has a very deleterious effect on the stability and precure characteristics of the finished binder solution which contains lignin and urea. Consequently, the free formaldehyde should be substantially removed from the resin to prevent premature reaction with these components. This may most easily be accomplished by adding sufficient ammonia to the phenolic resin solution to tie up the formaldehyde in the form of hexamethylene tetramine. The "hexa" has no deleterious effect and in fact is somewhat beneficial since the formaldehyde therein becomes available for reaction during curing of the formulation in the curing ovens.

The dicyandiamide-formaldehyde is easily prepared by heating dicyandiamide and formaldehyde together employing from 1 to 2. moles with about 1.5 moles being preferred of formaldehyde per mole of dicyandiamide. Reaction is most easily carried out in an aqueous solution without a catalyst although small quantities of catalyst can be employed.

The conditions for preparing both the dicyandiamide-

| | Resin manufacture, percent by weight, solids basis | | | | Tensile strengths, p.s.i. | | | | | |
|---|---|---|---|---|---|---|---|---|---|---|
| | PF | DF | Lignin | Urea | Room temp. | 400 °F. | 500 °F. | 600 °F. | 700 °F. | 800 °F. |
| A | 100 | 0 | 0 | 0 | 272 | 269 | 114 | 0 | 0 | |
| B | 50 | 0 | 30 | 20 | 562 | 505 | 308 | 45 | 0 | 0 |
| C | 80 | 20 | 0 | 0 | 423 | 437 | | 277 | <40 | 0 |
| D | 40 | 10 | 30 | 20 | 766 | 612 | | 395 | 290 / 225 | |
| E-1 | 32 | 8 | 40 | 20 | 552 | 631 | | 430 | 196 | |
| E-2 | 32 | 8 | 30 | 30 | 498 | 418 | | 319 | 265 | |
| E-3 | 24 | 6 | 40 | 30 | 465 | | 419 | 344 | 302 | |
| E-4 | 24 | 6 | 50 | 20 | 465 | | 581 | 103 | 136 | |

A is a straight phenolic resin; B is a phenol-formaldehyde: lignin: urea resin; C is a phenol-dicyandiamide-formaldehyde resin; D is a phenol-dicyandiamide-formaldehyde: lignin: urea resin made in accordance with this invention; E represents four resins keeping the phenol-dicyandiamide ratio at 4:1 to make the thermosetting resin, made with phenol-dicyandiamide-formaldehyde at levels of 30% and 40% made in accordance with this invention.

While a wide range of alkaline-catalyzed phenol-formaldehyde resins may be employed in the formulation, these resins in order to achieve the desired results must have certain characteristics. The resins must be water soluble and water-dilutable to low solids contents, i.e., to solids contents as low as about 2%. To obtain this necessary water solubility and dilutability, formation of polymeric materials during cooking should be avoided, with substatnially all the resin being in the form of formaldehyde and phenol-formaldehyde resins are quite similar except that the dicyandiamide reacts readily without a catalyst. It is possible in preparing a mixed resin to react the dicyandiamide with formaldehyde add phenol-formaldehyde and catalyst, and react these materials to yield a mixture of resins using only one reaction vessel. Preferably, the dicyanamide and phenol may be reacted separately with formaldehyde and the two resinous products obtained thereby subsequently mixed together.

Any of the alkali lignins may be employed in the formulation. These lignins are all derived by an alkaline digestion of lignocellulose material. Most commonly they are obtained as by-products from alkaline processes of paper making where sodium hydroxide alone or in combination with sodium sulfide is employed. These lignins are generally referred to as soda and kraft or sulfate lignins after the pulping process used. Such alkali lignins should be employed in the formulation in the free acid form, i.e., that form where the water solubilizing alkali cations have been replaced by hydrogen through acidification. The alkali salt form of lignin contains large quantities of alkali metal which has a deleterious effect on the mineral fibers and should not be used. The free acid alkali lignin is not soluble in water. It is, however, soluble even at dilute concentrations in aqueous solutions of phenolic resin, dicyandiamide resin and urea providing the pH is held above 7.0. Where it is desired to pre-mix the lignin and urea in solution prior to admixture to the phenolic resin, ammonia should be employed to solubilize the lignin.

In the preferred practice of this invention, the alkali lignin employed is a kraft pine lignin. Other alkali lignins such as soda pine and hardwood and kraft hardwood require a somewhat high pH to attain good water dilutability. The higher pH in turn tends to reduce the stability of the formulation.

It is of great importance that the ingredients be employed in correct proportions in the preparation of the formulation. For example, where less than 20% of the total solids content is the thermosetting resin (phenol-formaldehyde + dicyandiamide formaldehyde), it has been found that insufficient reactive groups are present in the mixture to obtain high strength bonds. Where above 70% of the total solids content comprises the thermosetting resin, the stability and dry tensile strength of the binder is impaired. In like manner, the presence of more than 60% lignin causes problems of stability, dilutability and precure. The minimum quantity of lignin which can be used is about 16%. Use of amounts of lignin smaller than 16% leads to excessively long cure times. The urea is limited to between 10 and 50% of the total solids content. Use of less urea than the minimum of 10% leads to problems of precure and use of more than 50% to excessive cure times. Additionally, if the advantageous increase in efficiency is to be attained the quantity of urea must be limited to less than five times the quantity of dicyandiamide-formaldehyde in the formulation. It will be noted that urea cannot be employed near the maximum permissible amount, about 40 to 50%, unless the dicyandiamide-formaldehyde constitutes at least 8 to 10% of the total solids content.

When binding mineral fibers about 30 to 50 percent of the theromsetting resin of which 20–25% is dicyandiamide-formaldehyde and 30 to 50 percent of lignin should be employed. The urea in this preferred formulation should constitute about 10 to 30 percent by weight total solids content of the binder and about 2.5 to 3.5 times the weight of the dicyandiamide-formaldehyde. These binder compositions generally employ a solids content between 2 and 25 percent. Within this preferred range an excellent balance of the components is obtained yielding a resin possessing all the desired properties for use in the binding of mineral fibers.

Various antioxidizing additives, such as phosphates, borates, and antimonates for use where exceptional fire resistance is required, may be employed with the formulation without difficulty. The binder has excellent punking resistance and except for very unusual cases such antioxidants will not be needed. Hexamethylene tetramine may also be employed to plasticize and provide additional reactants during curing. As some hexamethylene tetramine is necessarily present due to the reaction of the free formaldehyde with ammonia after resin formation, additional amounts will not be generally needed or desirable except where the phenolic resin has a low methylol substitution, i.e., 1.3 to 1.6 methylols per mole of phenol.

The pH of water solutions of the resin compositions should be maintained above 7.0 to achieve proper heat stability and curing. pH's above and about 10 tend to promote low body times. Generally, the admixture of the components will yield solutions in this pH range, however, where adjustment is necessary, it can be made by the addition of small quantities of an alkaline material, preferably ammonia.

We claim:
1. An aqueous binder whose reactive components consist essentially of a water-dilutable thermosetting resin, alkali lignin, and urea; wherein (a) said thermosetting resin is from 20 to 70 percent by weight of the total solids content of said binder, said thermosetting resin consisting essentially of from 10 to 50 percent by weight of dicyandiamide-formaldehyde and from 50 to 90 percent by weight of phenol-formaldehyde, (b) said alkali lignin is from 16 to 60 percent by weight of the total solids content of said binder and (c) said urea is from 10 to 50 percent by weight of the total solids content of said binder, the quantity of said urea in said binder being no more than five times the weight of said dicyandiamide-formaldehyde.

2. The aqueous binder of claim 1 wherein (a) said thermosetting resin is from 30 to 50 percent by weight of the total slids content by said binder and 20 to 25 percent by weight of said thermosetting resin is dicyandiamide-formaldehyde, (b) said alkali lignin is from 30 to 50 percent by weight of the total solids content of said binder, and (c) said urea is from 10 to 30 percent by weight of the total solids content of said binder, said urea being equal to from 2.5 to 3.5 times the weight of said dicyandiamide-formaldehyde.

3. A composition for binding mineral fibers whose reactive components consist essentially of an aqueous binder solution, which is substantially free of unreacted formaldehyde, having a pH from 7 to 10 and a solids content from 2 to 25 percent, said solids content containing (a) from 20 to 70 percent by weight of a thermosetting resin which consists essentially of from 10 to 50 percent by weight dicyandiamide-formaldehyde and the remainder being alkaline-catalyzed phenol-formaldehyde, (b) from 16 to 60 percent by weight of kraft pine lignin and (c) from 10 to 50 percent of unreacted urea, equal to from 2.5 to 3.5 times the weight of said dicyandiamide-formaldehyde.

4. The aqueous binder of claim 3 wherein said thermosetting resin is from 30 to 50 percent by weight of the total solids content and 20 to 25 percent by weight of said thermosetting resin is dicyandiamide-formaldehyde, said kraft pine lignin is from 30 to 50 percent by weight of the total solids content, and said unreacted urea is from 10 to 30 percent by weight of the total solids content.

References Cited

UNITED STATES PATENTS

| | | | |
|---|---|---|---|
| 3,004,941 | 10/1961 | Mestdagh et al. | 260—29.3 |
| 3,223,668 | 12/1965 | Stalego | 260—29.3 |
| 3,285,801 | 11/1966 | Sarjeant | 161—170 |
| 3,336,185 | 8/1967 | Melbing | 161—70 |

WILLIAM H. SHORT, Primary Examiner

E. NIELSEN, Assistant Examiner

U.S. Cl. X.R.

117—126; 156—335; 161—170; 260—29.3

UNITED STATES PATENT OFFICE
CERTIFICATE OF CORRECTION

Patent No. 3,463,747                                                    August 26, 1969

Lawrence E. Noll et al.

It is certified that error appears in the above identified patent and that said Letters Patent are hereby corrected as shown below:

Column 2, line 46, "diluatable" should read -- dilutable --.
Column 3, line 26, "was" should read -- were --.

Signed and sealed this 19th day of May 1970.

(SEAL)
Attest:

Edward M. Fletcher, Jr.                           WILLIAM E. SCHUYLER, JR.
Attesting Officer                                          Commissioner of Patents